United States Patent [19]

Griffin et al.

[11] Patent Number: 4,949,251
[45] Date of Patent: Aug. 14, 1990

[54] EXACTLY-ONCE SEMANTICS IN A TP QUEUING SYSTEM

[75] Inventors: Robert W. Griffin, Mason; James P. Emmond, Amherst, both of N.H.

[73] Assignee: Digital Equipment Corporation, Maynard, Mass.

[21] Appl. No.: 220,502

[22] Filed: Jul. 18, 1988

[51] Int. Cl.$^5$ .............................................. G06F 15/40
[52] U.S. Cl. .................................. 36.4/200; 364/225; 364/225.2; 364/282.1
[58] Field of Search ... 364/200 MS File, 900 MS File

[56] References Cited

U.S. PATENT DOCUMENTS 4,615,001 9/1986 Hudgins ............................. 364/200
4,627,019 12/1986 Ng ...................................... 364/900

OTHER PUBLICATIONS

*VAX Software Handbook,* Digital Equipment Corporation, 1981, pp. 333-359.
*Guide to VAX/VMS File Applications,* Digital Equipment Corporation, 1986, pp. 2-8, 2-22 to 3-3.
*VAX RMS Journaling Manual,* Digital Equipment Corporation, Jul. 1987, pp. 1-1 to 1-3, 4-1 to 4-23.
J Eliot B. Moss, *Nested Transactions—An Approach to Reliable Distributed Computing,* The MTT Press, Cambridge, Mass., 1985.

*Primary Examiner*—David Y. Eng
*Attorney, Agent, or Firm*—Arnold, White & Durkee

[57] ABSTRACT

Exactly-once semantics in a transaction processing system are provided by queuing requests for data base transactions on a "task queue" and assigning a unique identification number to each request or "task" placed on the queue. When a requested transaction is performed, the task identification number is written into the data base when the data base is updated at the end of the transaction. To ensure that the updates are made exactly once in the event of a partial system failure or "crash", the data base is read to obtain any preexisting task identification number before any updates are made. If a match occurs between the identification number of the current task and any preexisting task identification number, the requested transaction is terminated without performing any current updates. Automatic recovery with exactly-once semantics therefore occurs as the result of resumed servicing of the task queue. A task which is initiated is not removed from the task queue until after its requested transaction is completed. When servicing of the task queue resumes during recovery from a partial system error, the data base has stored on it all of the identification numbers.

9 Claims, 6 Drawing Sheets

EXACTLY-ONCE SEMANTICS IN A TP QUEUING SYSTEM

BACKGROUND OF THE INVENTION

1. Technical Field

The present invention generally relates to reliable distributed computing, and more particularly to transaction processing. Specifically, the present invention relates to a method of insuring that a desired transaction either happens exactly once in entirety or not at all, even when there is a partial system failure while the transaction is processed.

2. Description of Related Art

A desirable feature of a computing system is the ability to recover from partial system failures A partial system failure occurs, for example, when the system "crashes" due to an infrequent software error in the operating system, and the operating system can be restarted. If an application program has a memory write operation in progress at the time of the system failure, it is most likely that the memory record will become erroneous. To enable the recovery of memory records after a partial system failure, it is necessary for the application program to keep backup copies of the records in nonvolatile memory. When the operating system is restarted, the memory records to be recovered are replaced with the backup copies. Then the application program must be restarted to repeat the operations having occurred after the backup copies were made.

To facilitate the making of backup copies and the recovery of memory records, the operating system typically provides an established set of memory management procedures that can be invoked or called from an application program. A typical example is a "recovery unit journaling" feature of Records Management Services (RMS) software sold by Digital Equipment, Corporation, Maynard, MA 01754, for use with the VAX/VMS operating system. To provide for recovery of a memory record, an initial portion of an application program allocates nonvolatile memory for backup copies by invoking an RMS procedure called by the program statement "$SET FILE [FILENAME]/-RU_JOURNAL" where FILENAME is the name of the file including the memory record to be recovered. To actually make a backup copy and to define the beginning of a "recovery unit," the application program invokes an RMS procedure called by the statement "$START_RU". To define the end of a "recovery unit," the application program invokes an RMS procedure called by the statement "$COMMIT_RU". If a partial system failure occurs during execution of the "recovery unit," then the memory record is recovered from the backup copy.

A "recovery unit" is comprised of a set of program statements between the "$START_RU" statement and the "$COMMIT_RU" statement. All of the statements in the "recovery unit" must be completed before the memory records modified by the statements in the recovery unit are made available for subsequent processing. In other words, the statements in the "recovery unit" specify operations in a single "transaction." The operations in a "transaction" are either all completed at once, or none of them is completed.

The operations in a transaction may modify multiple files in different data bases which could be accessed by multiple processors or nodes in a distributed computing system. In this case, when one processor or node is performing a transaction which modifies a respective set of files, none of the other processors may modify that set of files. Therefore, the application program can ensure internal consistency of the data stored in the files. By defining a group of related operations as a recovery unit, for example, a transfer of funds involving the debiting of a first account and the crediting of a second account, the programmer can ensure that all of the operations in the transaction will be complete before the updated records are made available for further use.

In the event of a partial system failure or other abnormal termination (such as a system "reset") of an application program, the files defined as recoverable will be recovered or updated only to the most recently completed recovery unit, and the data in the files will be consistent. For example, in a transfer of funds application, a system failure will not cause the first account to be debited without the crediting of the second account.

In a typical "transaction processing" system the states of the "objects" manipulated by the transaction are deemed to be whatever is recorded in permanent memory. In a multiprocessor system, for example, a typical method of communication is by shared access to a common permanent memory holding the states of the objects. To restore the state of the system after "crash" of any one of the processors, the memory management procedure for recovery unit journaling performs a well-known "state restoration method."

In the state restoration method, the "START" operation causes "write locks" to be put on the permanent memory records for all of the objects manipulated by the respective transaction. The "START" operation then causes the states of the objects to be saved in the permanent memory records which hold the states of the objects, and the records are copied so that a copy is kept for modification during execution of the recovery unit. Then the transaction defined by the recovery unit is performed upon the copy kept for modification. When the transaction is finished, the "COMMIT" operation causes the states in permanent memory of all of the objects manipulated by the recovery unit to be updated, in one "atomic" step, with the modifications having been made during the transaction. Finally, the write locks on the permanent memory records having been updated are released.

It should be apparent that the implementation of the state restoration method involves only one difficult step, which is the "atomic" step of updating the permanent memory states of all objects manipulated by the recovery unit. By definition, an "atomic" step is a step that is performed in its entirety, or not at all, regardless of a partial system failure or abnormal termination of the application program. Although such an "atomic step" could be performed directly by a specially designed memory unit, it can also be performed indirectly in any conventional computing system by allocating two permanent memory records for every object manipulated during a transaction, and allocating an additional permanent memory location as a flag or switch indicating which permanent memory record holds the permanent state of the object; the other permanent memory record is used whenever the volatile state of the object is written to permanent memory. Therefore, the updating of the permanent memory state of all objects manipulated by the recovery unit can be performed in one atomic step by execution of a single machine instruction that changes the flag or switch for the permanent memory records of the objects modified by the transaction.

In the above implementation, a "partial system failure" is any failure which insures that the single machine instruction is either completed in its entirety or not at all. The "START" operation write locks the respective permanent memory files defined for a respective processor against access by other processors, and saves the respective files by causing any write operations to be performed upon copies in respective permanent memory flagged for use whenever writing to permanent memory. The "COMMIT" operation switches the flag for the respective files, and finally removes the write locks.

As described above, the state restoration method insures that the updates made by any given processor are made consistently, even when a crash may prevent all of the updates from being made at any given node. A more difficult problem is ensuring that after a crash, the state of the system can be automatically restored and processing may continue until completion with the assurance that the transactions interrupted by the crash are completed exactly once. For some transactions, at-least-once semantics is acceptable. For example, a transaction that updates the mailing addresses of newspaper subscribers could be performed more than once without any adverse consequences. In other transactions, however, exactly-once semantics is crucial. In a financial accounting system, for example, a transaction that debits one account and credits another must be performed exactly once for each real-world financial transaction.

Exactly-once semantics has been assured by using procedures such as the "two-phase commit protocol" and its derivations. These procedures are described in J. Eliot B. Moss, *Nested Trasactions—An Approach to Reliable Distributed Computing*, The MIT Press, Cambridge, Mass., 1985. The "two-phase commit protocol" permits a recovery with exactly-once semantics even though updates to files are performed by a number of different processors in a system. Typically in such a system each transaction is assigned a unique "transaction identification number" and each object is assigned a unique "object identification number" so that the respective operation to be performed or acknowledged for a transaction by any given processor can be signalled by the receipt or transmission of the transaction identification number, and the changes to the state of an object can be communicated along with the object identification number. One processor in the system is assigned the role of a coordinator which initiates a transaction. To begin a transaction, the coordinator sends a prepare command to all of the processors participating in the transaction.

Upon receipt of the "prepare" command, each processor participating in the transaction performs the "START" operation described above, writes the transaction ID into permanent memory to remember that it is prepared for the transaction, and then sends an acknowledgment back to the coordinator processor, but does not yet perform its part of the transaction. The coordinator waits for acknowledgments from all of the participants. When the coordinator receives acknowledgments from all of the participants, the coordinator records in permanent memory a list of the participants and a notation that the transaction is now being completed.

The coordinator then sends "commit" commands to all of the participants. Upon receipt of the "commit" commands, each participant checks its permanent memory for the transaction ID to determined whether it has been prepared for the transaction, and if it has, it performs its part of the transaction, and then performs the "COMMIT" operation described above (which in the process clears the transaction ID from permanent memory when permanent memory is updated), and finally sends an acknowledgment back to the coordinator; if the transaction ID cannot be found in permanent memory, the participant just sends an acknowledgment back to the coordinator. When the coordinator receives acknowledgments from all of the participants, it erases the list of participants from permanent memory, and the transaction is finished.

If a crash occurs during the transaction, then the coordinator may use its list of participants to ensure completion of any transaction that was being completed but which did not finish. "Commit" commands are retransmitted to each of the participants included in the list. Any participant that did not complete its portion of the transaction because of the crash (as indicated by its permanent memory having a record of preparation for the transaction ID) will complete its portion for the first time. Any participant that had already completed its portion of the transaction (as indicated by its permanent memory having no record of preparation for the transaction ID) will not repeat its portion of the transaction. Therefore, the two-phase commit protocol ensures that all portions of an interrupted transaction are performed exactly once when the recovery is finished.

SUMMARY OF THE INVENTION

Exactly-once semantics in a transaction processing system are provided by queuing requests for data base transactions in a "task queue" and assigning a unique identification number (TASK_ID) to each request or "task" placed in the task queue. The identification number is available during execution of the requested data-base transaction. In particular, the identification number is written in the data base at the sam=time (i.e., during the same "recovery unit") as updates are made as a result of execution of the requested transaction.

To ensure that the updates are made exactly once in the event of a partial system failure or "crash," the data base is read to obtain any preexisting identification number before any updates are made. Presuming that the portion of the data base allocated for the identification number is initially formatted or cleared, the number read from the data base will match the identification number for the task if and only if the task has already been completed. Therefore, if a match occurs, the current execution of the requested transaction is terminated without performing the update a second time.

This method of ensuring exactly-once semantics, in combination with the task queues, provides an elegant recovery mechanism. After completion of each task placed on the task queue, the task is removed from the queue. If a partial system failure occurs during servicing of the task queue, the servicing may restart in the usual fashion by servicing the task at the head of the queue. In the event that the partial system failure occurred just after the completion of a task but before the task could be removed from the task queue, the reservicing of the same task would be aborted upon discovering that the identification number of the task matches the identification number having been written into the data base just prior to the partial system failure.

BRIEF DEscRIPTION OF THE DRAWINGS

Other objects and advantages of the invention will become apparent upon reading the following detailed description and upon reference to the drawings in which.

While the invention is susceptible to various modifications and alternative forms a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
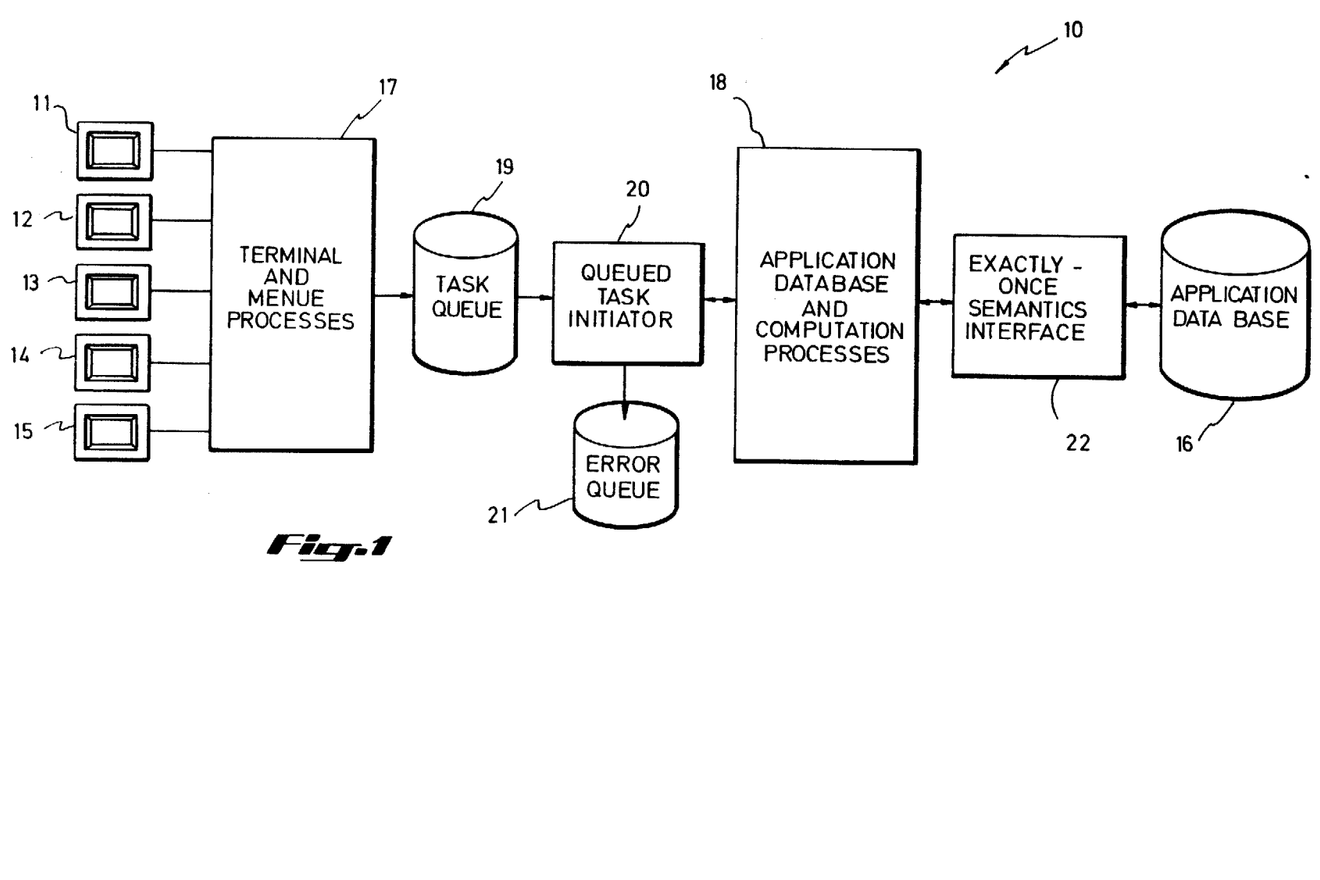
FIG. 1 is a block diagram of a transaction processing system incorporating a task queue and an exactly-once semantics interface in accordance with the invention.

Turning now to FIG. 1, there is shown a block diagram of a transaction processing system generally designated 10 incorporating various aspects of the present invention. As introduced above, a transaction is a series of operations that must execute as a unit or not at all. By subdividing data processing operations into individual transactions, the operations and the data managed by the system remain consistent. Also, since the data processing operations are subdivided into individual units, it is possible to expand or change the configuration of the system, without changing the programing that defines the transactions.

In general, transaction processing is preferable over alternatives such as time sharing or batch processing when the system must support a moderate to large number of users at the same time, the data processing operations may be subdivided into transactions that use the same set of data files or data bases, and the data processing operations involve predefined, structured work. Transaction processing is useful, for example, in inventory systems, reservation systems, and other data base management systems.

A user typically begins a transaction in a transaction processing system by entering information into a form displayed on a terminal. For this purpose the system 10 in FIG. 1 includes five video display terminals 11 to 15. The system 10 processes the information and interacts with one or more files in an application data base 16.

The performance of a transaction processing system can be improved by executing the terminal and menu functions separate from the data base and computation functions. As shown in FIG. 1, for example, the system 10 has terminal and menu processes 17 separate from application data base and computation processes 18. The processes 17 controlling the terminal and menu functions are referred to as the "front end" of the transaction processing system, and the data base and computation processes 18 are referred to as the "back end" of the system.

The terminal and menu processes 17 and the application data base and computation processes 18 could be performed by separate data processors, or they could be performed by a single data processor having an operating system that supports a multiprocessing environment. A system 10 employing a single processor is referred to as a "single-node" system and a system having more than one data processor is referred to as a "multiple-node" system or network. In a multiple-node system, the performance and resource sharing of the system is improved by installing the terminal and menu processes 17 on one computer or set of computers, and the application, data base and computation processes 18 on another computer or set of computers.

To improve the performance of the system 10 still further, data provided by the terminal and menu processes 17 is transmitted to the application data base and computation processes 18 through a "task queue" 19. The system performance is especially improved for transaction processing applications requiring data capture and deferred processing of data, high application availability and transaction persistence. An example of such an application is the processing of time card data that is entered into a system in a very short amount of time during a shift change. In such an application, the processing of each data item immediately could have an adverse effect on the overall performance of the system, so that it is useful to be able to capture the data and store it in the task queue 19 for future processing. This type of processing is also known as "desynchronized processing" because the data capture and the data processing are not synchronized.

The task queue 19 enhances the availability of the system when the terminal and menu processes 17 are performed by at least one processor that is separate from the processor or processors performing the application data base and computation processes 18. In such a distributed environment, if the back-end processor or processors fail, the front-end processor or processors can continue processing by submitting the tasks to the task queue 19.

As further described below, the task queue 19 can be used in conjunction with queueing facilities that permit a transaction to be completed after a partial system failure or other abnormal termination interrupts the processing of the transaction. The system 10 shown in FIG. 1, for example, has a queued task initiator 20 that will reinitiate an interrupted task until the task is completed. Once the task is completed, it is removed from the task queue 19.

Completion of a task does not necessarily mean that the application associated with the task was successfully performed because the application data base and computation processes 18 may detect the presence of an error in the data to be processed or a failure in the system 10 that prevents the application from being performed. In either case, the queued task initiator 20 places an error code for the task in an error queue 21 before removing the task from the task queue 19. Also, depending upon the application, it may be desirable for the queued task initiator 20 to transfer some or all of the task data from the task queue to the error queue 21 when the respective application cannot be normally completed, in order to permit the task to be completed after erroneous data is corrected or after the system 10 is repaired. The error codes placed in the error queue 21, for example, are periodically reviewed by a system operator (not shown) to take appropriate corrective action.

In accordance with an important aspect of the present invention, the application data base and computation processes 18 update the application data base 16 through an exactly-once semantics interface 22 that permits the system 10 to automatically recover from a partial system failure or other abnormal termination of an application in such a way that the interrupted task or tasks are performed exactly once. Without the once-only semantics interface 22, the system 10 could possibly cause an interrupted task to update the application data base 16 twice. For example, if the queued task initiator 20 were to submit a task to the application data base and computation processes 18, and a partial system failure or abnormal termination of the application were to occur after completion of the requested transaction but before the queued task initiator 20 were to remove the task from the task queue 19, then it would be possible that the application data base 16 would be updated a second time when the queued task initiator 20 were to reinitiate the interrupted task during the automatic recovery.

The exactly-once semantics interface 22 includes means operative after a partial system failure or other abnormal termination of an application process for detecting that reinitiation of the interrupted application is attempting a duplicate update of the application data base 16. Upon detecting such a reinitiation of the application process, the exactly-once semantics interface 22 prevents any duplicate update of the application data base 16 and returns a completion message to the queued task initiator 20. Upon receipt of the completion signal, the queued task initiator 20 removes the task from the task queue 19.

As further described below, the exactly-once semantics interface 22 preferably detects the attempted duplicate update of the application data base 16 by comparing a unique task identification number corresponding to each task initiated by the queued task initiator 20 to a record of one or more task identification numbers having been previously stored in the application data base 16. It is assumed that the application data base is initially formatted in such a way that no recognizable task identification number is initially recorded in the application data base. Whenever the interface 22 finds a match between the task identification number of the task to be performed and a previously recorded task identification number, it determines that a duplicate update of the application data base 16 is being attempted and prevents the duplicate update from occurring.

Figure 2:
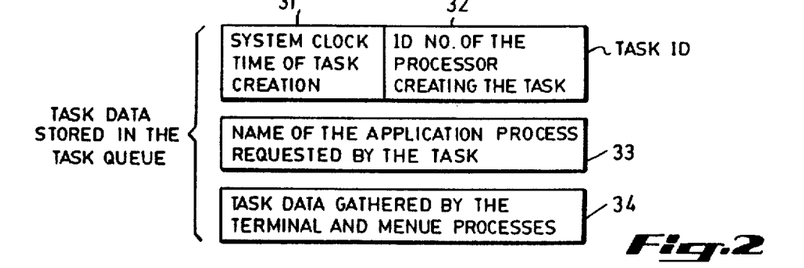
FIG. 2 is a diagram of the preferred format of task data stored in the, task queue used in the system of FIG. 1.

Turning now to FIG. 2, there is shown a preferred format for a record of task data that is stored in the task queue (19 of FIG. 1). Whenever the terminal and menu processes 17 have gathered data for a transaction to be performed by the application data base and computation processes (18 in FIG. 1), the terminal and menu processes create a "TASK_ID" for the requested transaction or task to be placed in the task queue 19. To permit the exactly-once semantics interface (22 in FIG. 1) to detect attempted duplicate updates, the TASK_ID is unique across time and space. In other words, any two tasks generated by the terminal and menu processes 17 at different times will necessarily have different respective tasks identification numbers, and also even if different processes create respective tasks at exactly the same time (for example, because they are created in different processors of a multiprocessor system) the task identification numbers will still b=different. As shown in FIG. 2, the uniqueness of the task identification number over time and space is guaranteed by forcing the task identification number from the concatenation of the time of task creation 31 as signaled by a clock in the system, and an identification number 32 of the processor or node that created the task.

The task data stored in the task queue for each task further include the name 33 of a respective application process requested by the task. When such a name is recognized by the application data base and computation processes 18, a prestored routine or application program is executed to perform the transaction requested by the task.

The task data stored in the task queue 19 for each task may further include task data 34 having been gathered by the terminal and menu processes for performance of the transaction requested by the task. When the application data base and computation processes 18 perform the transaction requested by the task, the respective task data gathered by the terminal and menu processes is used as input data possibly in conjunction with other input data read from the application data base 16.

It is assumed that despite a partial system failure affecting the terminal and menu processes 17, the task queue 19 will receive task data in the format of FIG. 2. In other words, it is assumed that the task queue 19 is organized as a file in permanent memory permitting all of the tasks data for any given task to be written into the task queue in one "atomic" operation. This can be done, for example, by using the "recovery journaling" feature of any number of conventional data base management programs, such as the RMS system sold by Digital Equipment Corporation, Maynard, Mass. 01754. In this case the program instructions for writing the task data into the task queue 19 are included in one "recovery unit." However, from the description below of FIGS. 5 to 9, a person of ordinary programming skill should learn how the task queue 19 can be organized to permit the task data of FIG. 2 to be placed in the task queue during a single "atomic" operation.

If a partial system failure occurs while a user is entering data at any one of the terminals 11 to 15, it is most likely that the failure will require the user to reenter the data for the task. Alternatively, the data currently being entered at each terminal for a task could be stored in a respective queue, and upon the partial system failure the data in the queue could be dequeued and then the user could continue data entry from the interrupted point. In general, as long as interactive data input to the system 10 is permitted there will always be some question of whether a partial system failure has or has not destroyed some data being entered into the system, because any data or user command that is placed in volatile memory but not yet placed in nonvolatile or permanent memory may be destroyed by a partial system failure. However, as will be further described below, so long as data to be processed is placed in permanent memory such as the task queue 19, the system can be designed to automatically recover from a partial system error or other abnormal termination of an application program.

The task queues (19 in FIG. 1) preferably is structured as a single-keyed indexed file. The key of the file preferably is formed by concatenating a preassigned priority number to the system clock time when the task was created, so that the numerical ordering of the keys correspond to the order in which the tasks are placed on the queue and are to be initiated. The operations of queuing a task, dequeuing a task, and reading the date for the next task can then be performed by conventional facilities for managing key-indexed files such as the facilities provided the RMS software.

Figure 3:
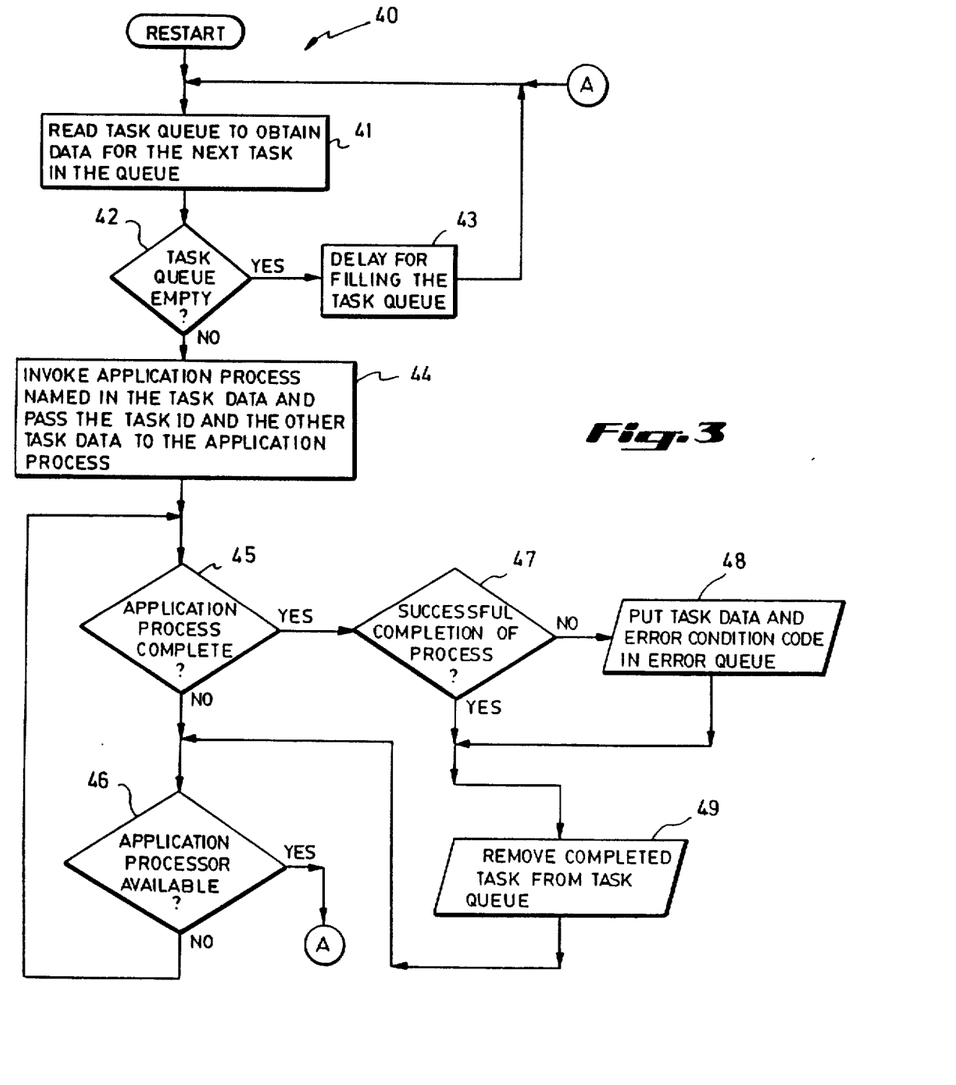
FIG. 3 is a flowchart illustrating the operation of a queued task initiator that services the task queue of FIG. 1.

Turning now to FIG. 3 there is shown a flowchart generally designated 40 of the procedure performed by the queued task initiator (20 in FIG. 1). In a first step 41, the queued task initiator reads the task queue 19 to obtain data for the next task in the queue (In a system having a single application processor, the data appears at the head of the queue). As tested in step 42, the task queue could be empty. In this case, in step 43, the queued task initiator delays for a certain amount of time to permit the task queue to be filled by the terminal the menu processes (17 in FIG. 1) before the queued task initiator again reads the task queue.

When task data is obtained from the queue, the queued task initiator performs a step 44 which invokes the application process named in the task data (33 in FIG. 2) and passes the task identification number and the other task data (34 in FIG. 2) to the application process. In step 45, the queued task initiator checks whether an application process is complete. If not, in step 46 the queued task initiator checks whether an application processor is available. If an application processor is not available, step 45 is performed again; otherwise, data for the next task in the task queue can be read in step 41. (Step 46 need not be performed in a single processor system, since in a single-processor system, the sole application processor will not be available until its current process is complete). When the invoked application process is complete, the queued task initiator 20 determines in step 47 whether the process has successfully completed. If not, then in step 48 the task identification number and an error condition code for the process having unsuccessfully completed is placed in the error queue 21. Finally, in step 49, the completed task is removed from the task queue, and the task initiation cycle is repeated beginning in step 46.

In a system 10 in which a single computer or processor performs all of the application data base and computation processes (18 in FIG. 1), step 44 need merely be a subroutine call which passes execution to the invoked application process until the invoked application process has been completed. In a multiple processor system in which a number of computers or processors simultaneously perform different application processes it is necessary for the system to insure that a conflict does not occur between the application processes that are occurring simultaneously.

A potential conflict known as "deadlock" may occur, for example, when each processor in a pair of processors needs a resource that is currently being used by the other processor. In this case, the deadlock must be resolved before either of the processors can complete their assigned application. Another source of potential conflict arises when the net result of two simultaneously performed applications is dependent upon whether a particular step in one application is performed before or after a particular step in another application. In such a case, it is desirable for the system to provide a consistent result that is dependent only upon the order in which the tasks appear in the task queue 19.

Although there are a number of ways of dealing with these conflicts, a particularly simple way is to inhibit the queued task initiator 20 from reading the next task in the queue and dispatching it to the next available application processor until the previously invoked task has seized control or "opened" all of the files that it might need. In other words, step 44 should not be completed until the invoked process has opened all of the files that it might need.

As introduced above, the exactly-once semantics interface (22 in FIG. 1) performs two functions. The first function is the usual function of ensuring that the update made by the transaction requested by the task is made in one "atomic" operation. In other words, immediately after a partial system failure or other abnormal termination of the application data base and computation processes, the state of the application data base (16 in FIG. 1) will contain all of the updates of the transaction having last completed and will not include any updates of any partially completed transactions. The exactly-once semantics interface 22 performs a second function of ensuring that when the system recovers, the application data base will not be updated more than once by a previously completed transaction. The queued task initiator (20 in FIG. 1) in combination with the exactly-once semantics interface (22) ensures, therefore, that all of the transactions requested by the tasks in the task queue (19 in FIG. 1) will be performed once and only once by the transaction processing system (10 in FIG. 1) even when the processing of a requested transaction is interrupted by a partial system failure or abnormal termination of an application.

The first function of the exactly-once semantics interface 22, that of ensuring atomic updates to the application data base, can be performed by using an existing memory or data base management facility, such as the RMS journaling facility described above. When such a facility is used, access to the application data base is controlled in a certain way so that it appears that all of the updates for a transaction occur simultaneously.

The second function of the exactly-once semantics interface 22 is provided by comparing the transaction identification number of the transaction accessing the application data base to a transaction identification number or numbers having been previously stored in the application data base. If there is a match, then an attempted duplicate update of the application data base is detected and a duplicate update is prevented from occurring. When an update of the application data base is made for a transaction, the identification number of the task requesting the transaction is written into the application data base to be available for comparison during the performance or a future transaction.

The exactly-once semantics interface 22 can be provided by high level language code incorporated into the high level language code for each application. In other words, for an application having the name "APPNAME", the high level code could appear as:

```
100   APPNAME:  START_TRANSACTION
110             READ (DATABASE, ID_RECORD)
120             IF (TRANS_ID FOUND_IN
         ID_RE-
         CORD)
130             THEN
140             END_TRANSACTION
150             RETURN_CODE ("THIS IS A
         DUPLICATE
160             QUEUED TASK INVOCATION")
170             RETURN
180             ELSE
                [READ/WRITE/MODIFY APPLICATION
         DATA
                TO PERFORM TRANSACTION]
300             WRITE (DATABASE, TRANS_ID
         IN
         ID_RE-
         CORD)
310             END_TRANSACTION
320             RETURN_CODE ("SUCCESS")
330             RETURN
340             ENDIF
```

In the program listing, the program statements "START TRANSACTION" and "END TRANSACTION" delimit the extent of a "recovery unit" and are recognized by the recovery feature of the memory or data base management facility. If this facility is, for example, the RMS journaling facility, the statement "START_TRANSACTION" has the specific form of "$START_RU" and the statement "END_TRANSACTION" has the specific form of "$COMMIT_RU".

In the above program listing, it is apparent that the code for the application data base and computation process corresponding to the application name appears sandwiched between the code for the exactly-once semantics interface. At a deeper level in the system, however, the exactly-once semantics interface affects the organization of the application data base and the reading and writing between the application data base and computation processes and the application data base. Therefore, the exactly-once semantics interface 22 need not be implemented as code at the same level as the code for the application data base and computation processes. Instead, the exactly-once semantics interface can be implemented in the deeper level subroutines which open the application file, read and write application records and close an application file. Such an organization is depicted in the flowchart 50 of FIG. 4.

For the sake of illustration, it is assumed that each application has an associated application file including records which define the permanent states of the objects which are modified by the transactions performed by the application. In this case the application may have the organization depicted in the flowchart 50 of FIG. 4. In the first step 51, the application file is opened. If the application file cannot be opened, the application must terminate without success. Otherwise, in step 52, the application may read and write application records in the application file. Finally, in step 53, the application file is closed, and execution returns successfully.

Figure 4:
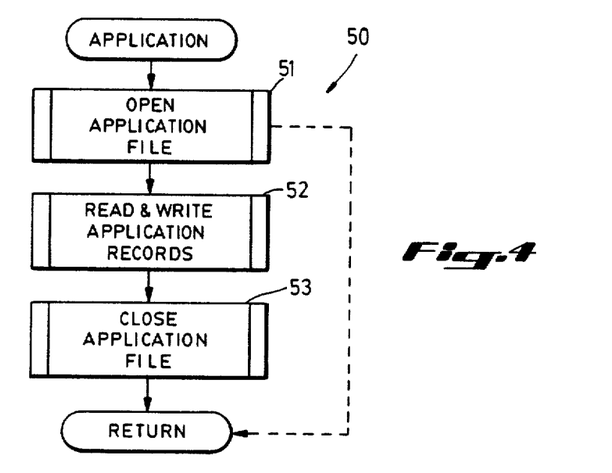
FIG. 4 is a generalized flowchart of an application that performs a task having been queued in the task queue of FIG. 1.

When an application is configured as shown in FIG. 4, the exactly-once semantics interface can be implemented in the routines which open the application file, read and write application records, and close the application file. The step 51 of opening the application file, for example, may delimit the beginning of recovery unit for the application, and the step 53 of closing the application file may delimit the end of the recovery unit. The matching of the task identification number may be performed in the step 51 of opening the application file, and if a match occurs, then execution may return immediately after the application file is closed. Otherwise, the task identification number may be written into the application file during the step 53 of closing the application file.

It should be noted that the task identification numbers can be stored in the application data base in any number of ways. If the queued task initiator 20 (FIG. 1) and the application data base and computation processes (18 in FIG. 1) are implemented on the same computer or processor, then attempted duplicate updating of an application data base after a partial system failure or abnormal termination will attempt to update the application data base a second time with the same task identification number that was just previously stored in the application data base. Therefore, it is only necessary to store a single task identification number in the application data base.

In a multiple processor system in which the queued task initiator 20 and application data base and computation processes are performed by multiple computers or processors such that multiple applications may access different application data base files at the same time, then it is at least necessary to store one task identification number in each application file. Depending upon how conflicts between simultaneous applications are resolved, it might be necessary to store a number of task identification numbers in each application file. In the worst case the data base must store the task identification number of every task on the queue that has been invoked, because it is possible that each such task may have been completed but not removed from the queue at the time of abnormal termination. The number of task identification numbers that must be stored can be cut down to one per application file by insuring that the queued task initiator will not invoke an application when the task queue has on it a prior task using the same application; in other words, in step 41 of FIG. 3, steps 42 and 44 will be skipped (and the "next task" pointer will not be advanced) if the next task data read from the queue has an application name matching an application name is the queue at a position closer to the head of the queue.

Figure 5:
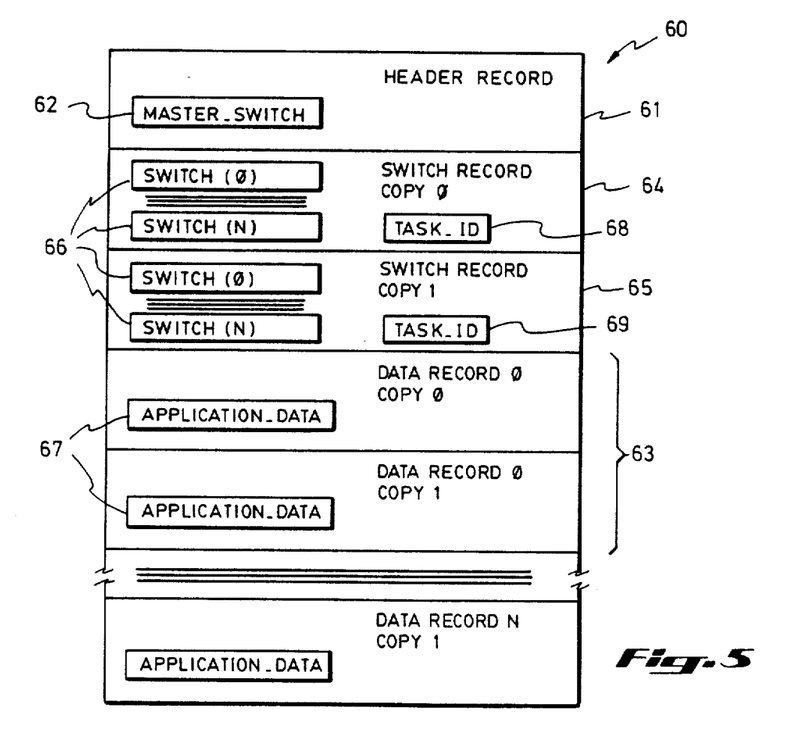
FIG. 5 is a diagram illustrating one possible arrangement of records in an application file to permit records to be updated simultaneously in one "atomic" step.

Turning to FIG. 5, there is shown a specific organization for an application file that could be used. In this case it is assumed that for each application there is provided a corresponding application file having a certain number of records holding the states of all of the objects modified by the transaction performed by the application. In other words, each application file in the application data base can be written to by only one respective application. However, each application may read any number of application files.

In order to permit the application to simultaneously update any number of records in its application file, the application file 60 includes a headed record 61 storing a master switch 62 and duplicate sets of application data records 63. If it is desired, for example, to update all of the application data in the application file 60, this can be done by changing the master switch 62 in a single atomic operation. The application file 60 is also organized to permit only a selected subset of the application data records 63 to be simultaneously updated. For this purpose, the application file 60 includes duplicate copies 64 and 65 of a switch record including a respective copy of a respective switch for each of the data records.

At any given time, the copy of a specified record which defines the current state of an object updated by the application can be found by reading the header record 61 to obtain the master switch 62, reading one of the two copies of the switch record as indicated by the state of the master switch, and then reading the particular copy of the desired application data record as indicated by the respective switch in the copy of the switch record having been read. Conversely, to simultaneously update a selected subset of the data records, it is merely necessary to first update the copy of each such record that does not currently include the present state of the objects updated by the application, next change the respective switches in the switch record that is not currently indicated by the master switch, and then throw the master switch 62. The simultaneous updating then occurs in the single atomic operation of throwing the master switch.

Since it is necessary to always read the header record and at least one of the switch records to read or update any of the data records in the application file 60, it is desirable to store the task identification number of the last update in at least one of these three records But in addition, since it is necessary to simultaneously update the task identification number when the data records are simultaneously updated, respective copies 68, 69 of the task identification number corresponding to the update should be stored in the respective copies 64, 65 of the switch record.

Figure 6:
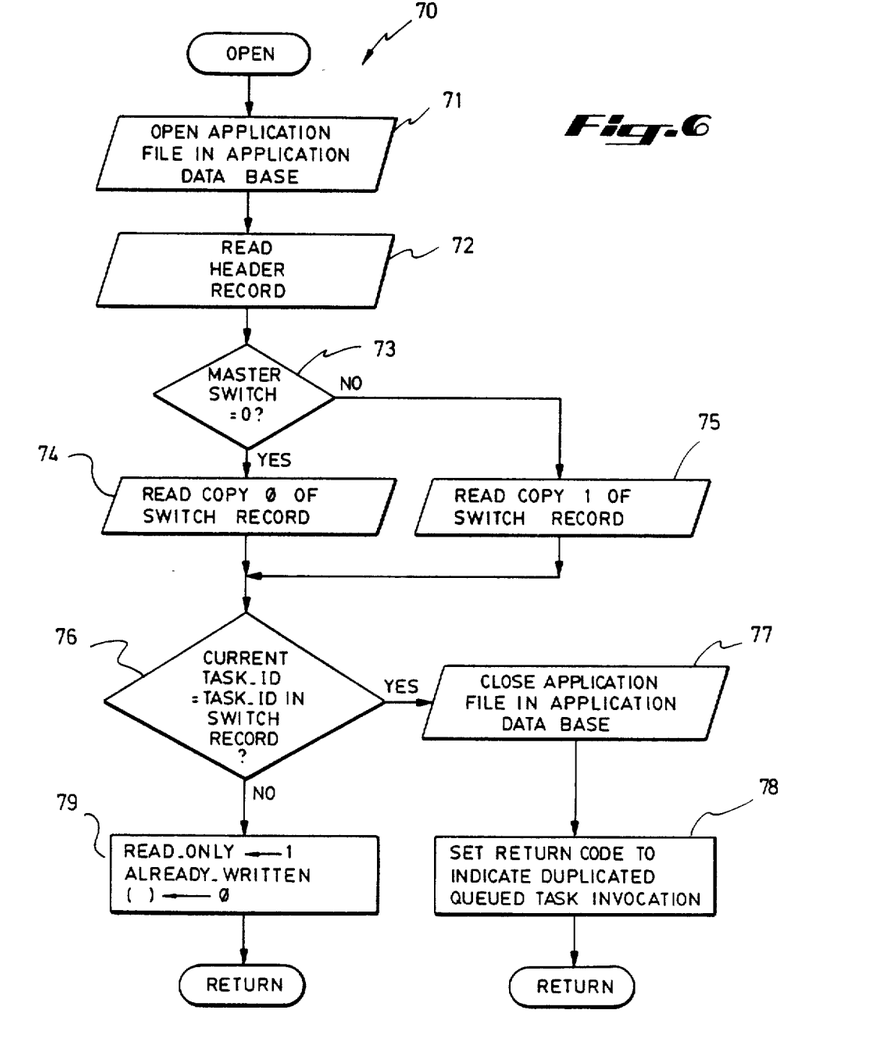
FIG. 6 is a flowchart of a subroutine for opening an application file to permit exactly-once semantics with regard to the application file.

Assuming now, for example, that the application file has the format as shown in FIG. 5, step 51 in FIG. 4 of opening the application file can be performed by a subroutine in the exactly-once semantics interface (22 in FIG. 1) corresponding to the flowchart 70 in FIG. 6. In the first step 71, the application file in the application data base is opened. In other words, other processes are precluded from accessing the application file until the application file is closed. Next, in step 72, the header record of the application file is read in order to obtain the state of the master switch. The state is tested in step 73, and if the master switch has a value of 0, then copy 0 of the switch record is read in step 74, and otherwise copy 1 of the switch record is read in step 75.

In order to detect an attempt to perform a duplicate update upon the application file, in step 76 the task identification number of the current task is compared to the task identification number read from the switch record. If they match, then in step 77 the application file in the application data base is closed, and in step 78 the return code is set to indicate duplicated queued task invokation. Execution therefore returns with a return code causing the application itself to terminate upon recognizing the return code.

If the task identification number of the current task does not match the task identification number read from the switch record, then in step 79 a "READ_ONLY" flag is set to one and an "ALREADY_WRITTEN" array is cleared. The "READ_ONLY" flag is used to eliminate the need for updating the header record and the switch record when the application file is only read during the current transaction. The "ALREADY_WRITTEN" array is used so that the application will be transparent to the organization of the application file when reading the same record after writing changes to it, and so that the switch for a respective record is thrown only once during the performance of a transaction when its respective data record is first accessed by the application for a write operation. After step 79, execution returns normally.

Figure 7:
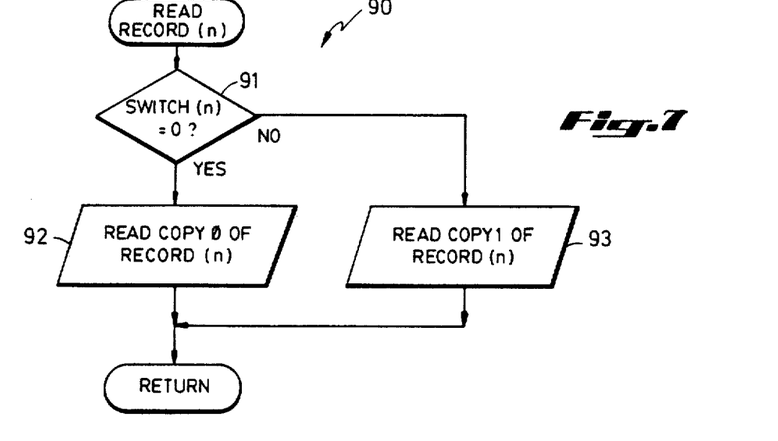
FIG. 7 is a flowchart of a subroutine to read a selected record of a file having once-only semantics.

Turning now to FIG. 7 there is shown a flowchart generally designated 90 that is called by the application to read a specified record n of its application file. A respective one of the two copies of the selected record is read depending upon the state of the switch for the specified record having been read from the switch record. The respective switch is tested in step 91. Either copy 0 of the specified record is read in step 92 when the switch is zero, or copy 1 of the specified record is read in step 93 when the switch is one.

Figure 8:
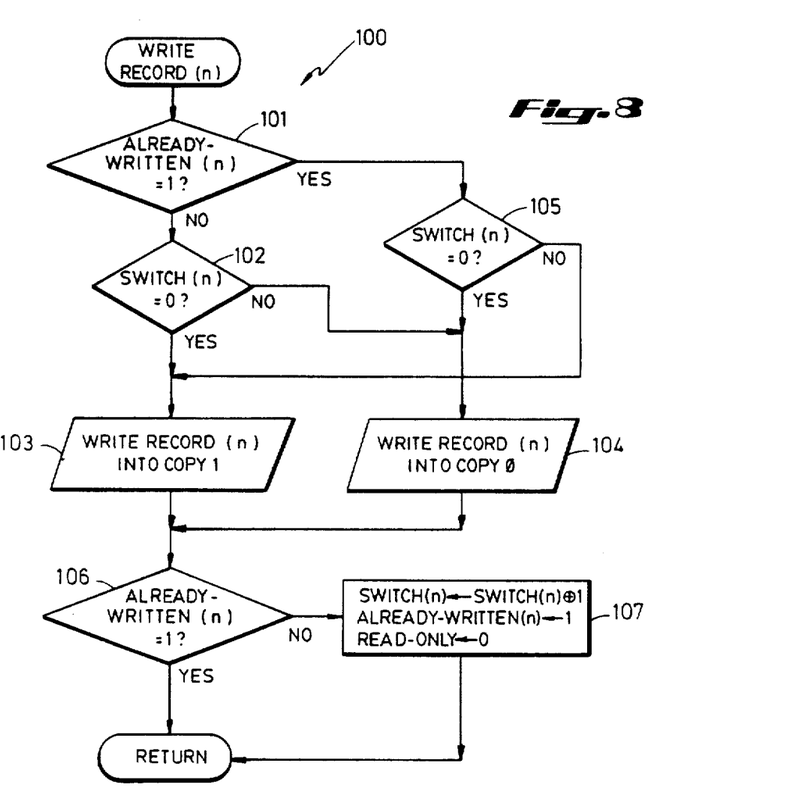
FIG. 8 is a flowchart of a subroutine to write a selected record into an application file having once-only semantics.

Turning now to FIG. 8 there is shown a flowchart generally designated 100 of a subroutine in the exactly-once semantics interface 22 for permitting the application to write a specified record n to its application file. In the first step 101, the respective entry of the "ALL-READY_WRITTEN" array is tested. Initially this entry will be zero, and in this case the switch for the specified record is tested in step 102 to determine whether the specified record should be written into copy 1 or copy 0 of the specified record in the application file. If the specified switch is 0, then in step 103 the record is written into copy 1; otherwise in step 104 the record is written into copy 0. However, the next time a write is attempted for the same task and for the same record, the respective switch will have been changed and in this case the switch is tested in step 105 in order to write to the same copy of the same record. Then in step 106 the respective entry in the "ALREADY_WRITTEN" array is tested to determine whether the specified record is being written to for the first time for the current task. If the record is being written for the first time, then in step 107 the respective switch is changed, the respective element of the "ALREADY_WRITTEN" array is set, and the "READ_ONLY" flag is cleared.

Figure 9:
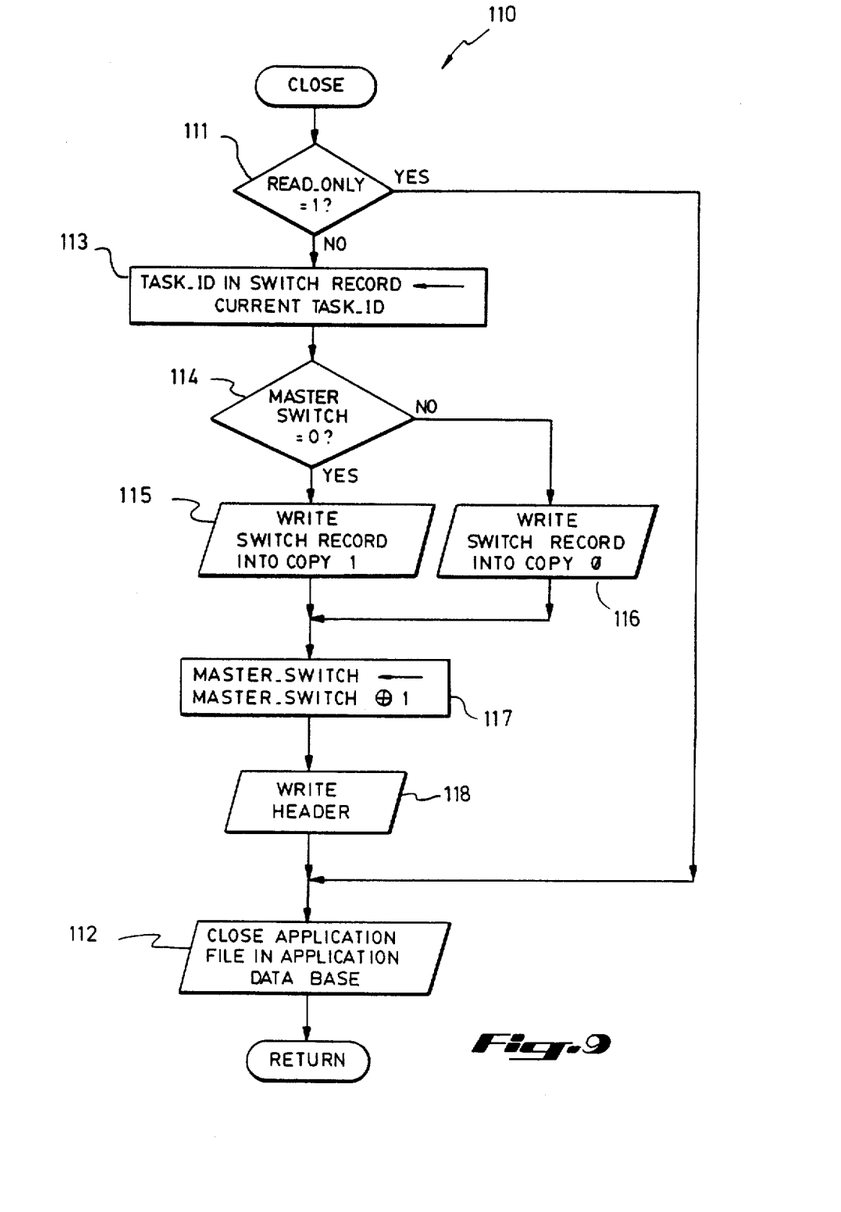
FIG. 9 is a flowchart of a subroutine to close an application file having once-only semantics.

Turning now to FIG. 9 there is shown a flowchart generally designated 110 for closing the application file. In a first step 111 the "READ_ONLY" flag is tested to determine whether the application program has only read its application file during the current transaction. If so, then the application file need merely be closed in step 112 without any updates to the switch record or the header. Otherwise, in step 114 the master switch is tested to determine whether the current switch record should be written into copy 1 of the switch record in step 115 or copy 0 in step 116. In step 117 the master switch is changed, and in step 118 the changed state of the master switch is written into the header of the application file. Finally, in step 112 the application file is closed.

In view of the above, there has been described a transaction processing system having a task queue initiator that operates in conjunction with an exactly-once semantics interface to provide automatic recovery from a partial system error or other abnormal termination. An application program can be installed into the system with little or no revision. The exactly-once semantics interface can be implemented in high-level code invoking the "recovery unit" feature of a conventional memory management or data base utility, or it can be implemented as low-level subroutines for opening, reading, writing, and closing application files. The system is easily adapted to multiprocessor configurations.

We claim:

1. A method of operating a data processing system of the kind having a data base, a task queue, and an application processor for performing data base updates requested by selected tasks queued in said task queue, said tasks being removed from said task queue after the respective data base updates requested by the tasks are performed, a partial failure of said system occurring after the performance of a data base update being capable of preventing the normal removal of a respective task from said task queue, said method preventing said respective task from thereafter causing the performance of a duplicate update of said data base, said method comprising the steps of assigning a respective task identifier to each task in the task queue, and before performing a data base update requested by a selected task;

reading the data base to obtain a task identifier previously stored during updating of the data base before failure occurs;

comparing the previously stored task identifier to the respective task identifier assigned to the respective task to determined whether both of the task identifiers identify the same task; and     inhibiting the data base update requested by the selected task, but not the removal of the requested task from the task queue, when the step of comparing determines that both of the task identifiers identify the same task, and otherwise writing the respective task identifier of the selected task into the data base when the data base is updated as requested by the selected task.

2. The method of operating a data processing system as claimed in claim 1, wherein the writing of the respective task identifier into the data base and all of the updating of the data base as requested by the requested task occur simultaneously.

3. The method of operating a data processing system as claimed in claim 1, wherein a multiplicity of tasks are stored in said task queue and said task identifier assigned to each task in the queue is unique.

4. A method of operating a transaction processing system of the kind having a nonvolatile memory storing an application data base; application processor means for processing transactions which update said data base such that each transaction performs a respective data base update in its entirety or not at all in the event of a partial system failure; a nonvolatile memory queue storing task data records identifying respective transactions; and queued task initiator means for selecting a particular task data recorded in said queue, invoking said application processor means to process the transaction identified by said selected task data recorded and upon completion of the processing of the requested transaction, removing the selected task data record from said queue; said method comprising the steps of     assigning a task identifier to each task placed in the queue, the task identifier assigned to each task data record in the queue being different from the respective task identifiers assigned to all of the other task data records in the queue,     operating said queued task initiator means to select the task data records in said queue and invoke said application processing means to process said transactions identified by said selected task data records, but before said processing of said transaction causes said data base to be updated, reading said data base to obtain a task identifier previously stored during updating of the data base before failure occurs, comparing the previously stored task identifier to the task identifier assigned to the respective task data record that identified said each transaction, and     inhibiting the updating of said data base by said processing of said each transaction, but not the removal of the selected task from the task queue, when said comparing determines that the compared task identifiers are the same, and otherwise writing into said data base said task identifier assigned to the respective task data record that identified said each transaction, said writing occurring simultaneous with the updating of said data base by the performance of said each transaction.

5. The method as claimed in claim 4, wherein each task identifier is stored in the task data record of its respective task.

6. The method as claimed in claim 4, wherein said task identifier includes a date and a time.

7. The method as claimed in claim 4, wherein said application data base includes a plurality of application files that are updated by the performance of said transactions, each application file stores the task identifier of the task data record having identified the transaction having last updated the application file, and said steps of reading said data base and writing into said data base include reading the stored task identifier from at least one of said application files to be updated by the performance of said each transaction, and writing into the application file said task identifier assigned to said respective task data record.

8. A transaction processing system comprising, in combination:

a nonvolatile data base memory for storing an application data base,     application processor means for processing transactions which update said data base such that each transaction performs a respective data base update in its entirety or not at all in the event of a partial system failure,     a nonvolatile queue memory for storing a queue of task data records, each of said task data records identifying a respective transaction, means for loading said task data records into said queue memory, and means for assigning a respective task identifier to each task data record loaded into said queue,     queued task initiator means for selecting a particular task data record in said queue, invoking said application processor means to process the transaction identified by said selected task data record and upon completion of the processing of the requested transaction, removing the selected task data record from said queue, and     exactly-once semantics interface means operative after said partial system failure for detecting that he processing of the transaction identified by said selected task data record would cause a duplicate update previously having been made to said data base by the requested transaction, and thereupon preventing the duplicate update and causing the selected task data record to be removed from said queue, wherein said exactly-once semantics interface means includes means for reading said application data base to obtain a task identifier previously stored during updating of the application data base before said partial system failure, means for comparing the previously stored task identifier to the respective task identifier assigned to said selected task data record to determine when the two compared task identifiers identify the same task, and means for inhibiting the application date base update by the processing of the transaction identified by said selected task data record, but not the removing of said selected task data record from said queue, when said means for comparing determines that said two compared task identifiers identify the same task, and means for updating said data base with the task identifier corresponding to said selected task data record when said application data base is updated by said processing of the transaction identified by said selected task data record.

9. The transaction processing system as claimed in claim 8, wherein said means for loading said task data records into said queue includes means for loading said task identifiers into said queue so that each task data record stored in said queue has a field containing the respective task identifier assigned to said each task data record.

* * * * *